April 6, 1965  J. K. STUESSEL  3,177,284
PRE-CAST SLAB AND ELECTRICAL CONDUIT ELBOW FITTING
Filed Nov. 14, 1962
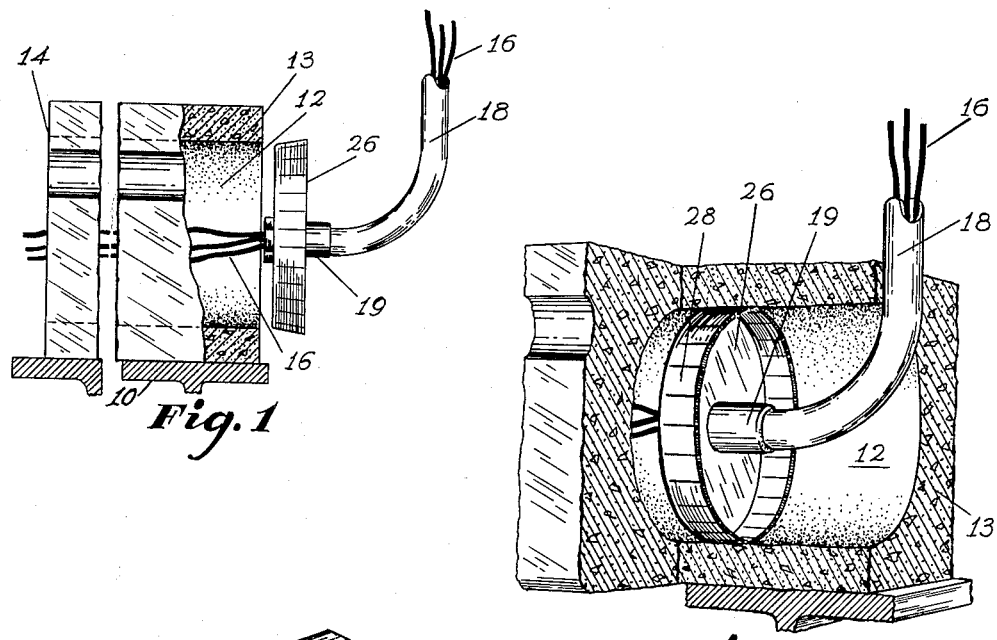
Fig.1
Fig.2
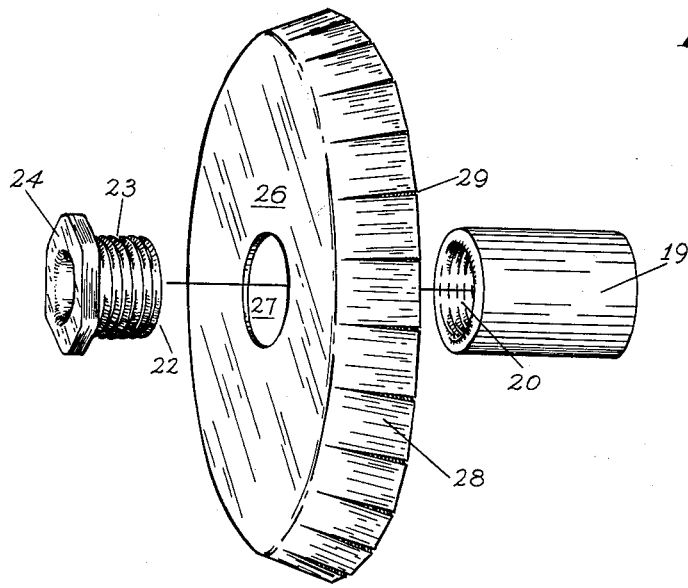
Fig.3
INVENTOR.
JOHN K. STUESSEL
BY
ROBERT L. KAHN
—Atty.

United States Patent Office 3,177,284
Patented Apr. 6, 1965

3,177,284
PRE-CAST SLAB AND ELECTRICAL CONDUIT ELBOW FITTING
John K. Stuessel, Dayton, Ohio, assignor to Flexiflor Electrical Systems, Inc., Dayton, Ohio, a corporation of Ohio
Filed Nov. 14, 1962, Ser. No. 237,500
1 Claim. (Cl. 174—81)

This invention relates to a terminal fitting for electrical wiring systems and in particular relates to a terminal fitting for use in the raceways provided by longitudinal passages in precast concrete slabs.

Concrete slabs for structural purposes are disclosed in United States Patent No. 2,299,111 and provide precast structural concrete members which function as beams and the like in buildings and other places. Slabs of this character are provided with longitudinal passages for conserving concrete, as well as improving the stress characteristics of the slab. These passages run for the entire length of the slabs with the ends of the slabs supported on columns or piers. In many instances, the passages terminate at the outer perimeter of a building. It is common to utilize one or more of the longitudinal passages as raceways for electric wiring. Frequently such wiring will extend for all or part of the length of a passage and will either enter or leave the passage at one or both ends of the slab.

The interior of the precast slab provides a perfectly satisfactory raceway for wiring and as a rule it is not necessary to provide any conduit or metal pipe for the wiring. However, once the wiring leaves the slab, regulations governing the installation of wiring generally necessitate the use of flexible or rigid metal conduit. The invention to be described provides a terminal fitting for the transition between the raceway in a precast slab and the metal conduit used for wiring in conventional manner.

Any wiring which emerges from or enters into the end of a slab does so usually at the perimeter of a building and consequently must turn usually at right angles in any of three directions—up, down or sideways. The wiring in such instance must be within steel conduit and the radius of the turn of the conduit into or out of the slab passage is a matter of convenience to an electrican, depending upon how much room he has and how sharp the conduit is shaped. The diameter of the conduit itself is generally small in comparison to the diameter of the slab passage. Thus as a rule, conduit will rarely have a diameter of more than one or one and a half inches while the diameter of the slab passage will generally be of the order of at least four inches and may be greater. The slab passage itself will generally have a circular section, although the invention is not limited thereto. Because of the difference in diameter of the conduit and slab passage, it is possible to utilize a substantial radius of curvature for bending or shaping the conduit at right angles where it enters into the slab passage. By controlling the exact distance that the conduit extends into the slab passageway from the end of the slab, there will be a tolerance allowed for the radius of curvature of the conduit.

The invention generally provides for a plate to which the end of the conduit is rigidly attached. This plate is shaped to fit within the passage of the slab for carrying the wiring and the plate may be disposed within said passage at any desired depth or distance from the end of the slab. Thus the plate forms a dividing wall between the raceway within the slab and the metal conduit which may extend partly into the slab passage.

In order that the invention may be understood, reference will now be made to the drawings wherein:

FIGURE 1 is a view partly in section and partly in elevation of a slab having a terminal fitting and a conduit in exploded relation.

FIGURE 2 is a view partly in section and partly broken away of a slab with the plate and conduit positioned.

FIGURE 3 is an exploded view of the plate embodying the present invention with a chase nipple and coupling in exploded view.

A precast slab, generally indicated by 10, is made of concrete and may have steel rod reinforcement or not, as desired. A slab of this type is more fully disclosed in the patent previously identified. Slab 10 has longitudinal passage 12 which is circular in section and extends the full length of the slab. Slab 10 is adapted to be supported at ends 13 and 14 and these ends may be at or near the perimeter of a building. Passage 12 of the slab functions as a raceway for wiring 16 which may consist of insulated wire for power or may be insulated wire for telephone and other signal systems. In any event, wires 16 are disposed within passage 12 but must enter into the raceway part of passage 12 by means of conduit 18. Conduit 18 may be either of the so called thin wall type or may be of rigid pipe. Conduit 18 may also be of the spiral steel type which is flexible and is well known in the trade as Greenfield. Conduit 18 terminates in coupling 19 having the interior part thereof 20 threaded. Cooperating with coupling 19 is a so-called chase nipple 22 in the form of a sleeve whose exterior surface is threaded at 23 and which is provided with a hexagonal outwardly extending flange 24. Chase nipple 22 can engage the threaded part 20 of coupling 19 and clamp any desired metal member or box therebetween. As illustrated here, plate 26 of galvanized iron is provided. Plate 26 has aperture 27 in the center thereof for accommodating threaded portion 23 of the chase nipple. It is understood that aperture 27 is smaller than the outer diameter of coupling 19, so that plate 26 is rigidly locked between the two nipples. Plate 26 has peripheral portion 28 provided with a number of radial slits 29 permitting the peripheral plate portion to be bent to form a sort of pie plate. The dimensions of the parts are such that the plate fits snugly within passage 12 of the precast slab. It is understood that if the passage 12 in a precast slab is non-circular, then the shape of plate 26 will accordingly be modified to suit the shape of the passage. In any event, plate 26 is provided with a multiplicity of strips which have sufficient spring thereto to permit the entire plate to be pushed snugly into the passageway for any desired distance. Thus as illustrated in FIGURE 2, the plate is pushed into the slab passageway for sufficient distance to take up part of the curvature of the conduit so that the portion of the conduit which finally is at right angles to the axis of plate 26 will be close to end face 13 of the slab. Thus the conduit will be able to extend laterally across the end faces of one or more slabs as desired.

It is not necessary that plate 26 be perpendicular to the length of a slab and it may be cocked to accommodate the conduit. While aperture 27 for the male and female portions of the nipple assembly is illustrated as being in the center of plate 26, this is not essential. It is possible is dispose aperture 27 off-center and turn plate 26 to accommodate the conduit coming in from any direction. Plate 26 will generally be made of galvanized iron or steel and can be about 22 gauge or heavier.

What is claimed is:

In combination with a pre-cast slab having a passageway disposed lengthwise therethrough to provide a raceway, a terminal fitting assembly comprising a metal conduit having an internally threaded end portion, a nipple having an externally threaded portion with an externally disposed flange for cooperating with said conduit end and a metal plate having an aperture therethrough for accommodating said nipple, said nipple and internally threaded conduit end portion being disposed on opposite sides of said plate with the nipple extending through the aperture and threaded tightly into said internally threaded conduit end portion whereby said plate is rigidly clamped between the end of said conduit and said nipple, said plate being disposed in said slab passageway with the conduit extending out from the slab end and curved laterally of the slab length as it extends from the plate, said plate being shaped to form a closure for the slab passageway and being maintained in position therein by a marginal portion of said plate provided with a plurality of slits extending inwardly from the edge of the metal to create fingers which are bent to lie along the surface of the slab passageway to provide a friction fit for the plate with the plate being positioned at any desired location within the slab passageway, said plate having a transverse dimension which is large in comparison to the conduit diameter so that said plate can be positioned within the slab passageway inwardly from the slab end to permit part of the conduit curvature to be accommodated within the slab between the plate and slab end and reduce the amount of clearance beyond the slab end to accommodate the curve of the conduit and permit the conduit to extend perpendicularly to the slab length at the slab end without excessively sharp conduit curvature.

References Cited by the Examiner
UNITED STATES PATENTS
611,442   9/98   Vaughan _____ 285—177 X E. JAMES SAX, *Primary Examiner.*
JOHN P. WILDMAN, *Examiner.*